No. 658,329. Patented Sept. 18, 1900.
A. BATH.
VEHICLE FRAME.
(Application filed Sept. 28, 1899.)
(No Model.)
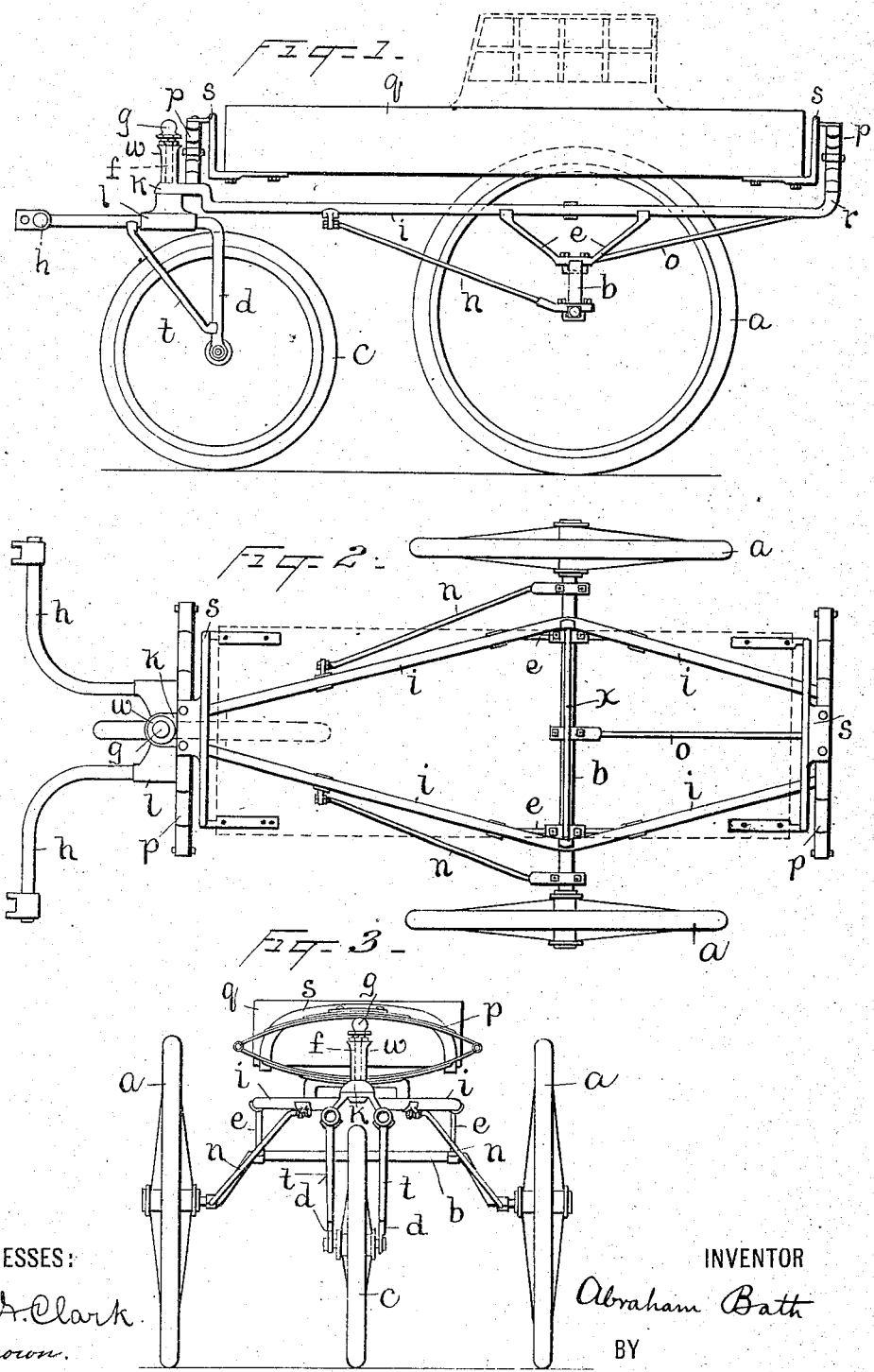

United States Patent Office.

ABRAHAM BATH, OF NEW YORK, N. Y., ASSIGNOR TO THE SAFETY THREE WHEEL VEHICLE COMPANY, OF NEW YORK.

VEHICLE-FRAME.

SPECIFICATION forming part of Letters Patent No. 658,329, dated September 18, 1900.

Application filed September 28, 1899. Serial No. 731,933. (No model.)

*To all whom it may concern:*

Be it known that I, ABRAHAM BATH, a subject of the Queen of Great Britain and Ireland, residing in the borough of Manhattan, in the city and State of New York, have invented Improvements in Vehicle Frames or Running-Gear, of which the following is a specification.

My invention relates to frames or running-gear for carriages or similar vehicles, more especially for vehicles having three wheels; and its object is to provide an inexpensive, light, and graceful frame or running-gear which shall at the same time be easily assembled, durable, and capable of resisting such strains as it may be subjected to.

The invention consists in the novel construction, combination, and arrangement of parts, as hereinafter more particularly described.

In the accompanying drawings, Figure 1 is a side view of a vehicle provided with my invention; Fig. 2, a plan view, and Fig. 3 a front view of the same.

In constructing my invention I employ two rear wheels $a$ $a$, having an axle $b$, and one somewhat-smaller front wheel $c$, mounted in a fork $d$. I prefer to use wire-spoke wheels provided with pneumatic tires on account of their lightness and strength; but any form of wheels can be used without departing from the spirit of my invention. The axle $b$ is curved or arched (see Fig. 3) and is provided with V-shaped pieces $e$ $e$, rigidly attached to each end of the elevated portion of the axle. The fork $d$ is attached at its upper end to a casting $l$, having a vertically-projecting post $f$, the upper extremity of which is provided with a nut $g$ or similar means for securing the same, as hereinafter described. From the casting $l$ arms $h$ project forward, to which shafts may be attached. A diagonally-extending brace $t$ (see Fig. 1) is provided for maintaining each leg of the fork $d$ in its proper position.

The connecting-pieces for the parts above described are preferably made of metal tubing, as by employing the same great lightness is secured with at the same time ample strength. The principal connecting-pieces are side tubings $i$ $i$, which are bent into the shape shown in Fig. 2, the rear ends of which are brazed or otherwise suitably rigidly attached to a casting $r$, the portions in proximity to the axle likewise attached to the V-shaped pieces $e$ $e$ and the front ends to opposite sides of a casting $k$. The casting $k$ bears a sleeve $w$, which is adapted to receive the post $f$, which after insertion is secured therein by the nut $g$. The post $f$ is free to turn in the sleeve $w$, and the casting $l$, to which it is attached, bears against the casting $k$ upon the lower end of the sleeve $w$, forming a fifth-wheel.

Rigidly attached to the axle $b$ near its ends are braces $n$ $n$, which extend forward, upward, and inward and are rigidly attached to the tubings $i$ $i$, and also rigidly attached to the axle near its middle point is a brace $o$, which extends backward and upward and is rigidly attached to the casting $r$. A horizontal brace $x$ connects the tubings $i$ near their middle parts, Fig. 2. To the castings $r$ and $l$ are bolted or otherwise suitably attached the supporting-springs $p$ $p$, to the upper parts of which are secured pieces $s$ $s$, which pass under the front and rear of the body $q$ and support the same.

It will be evident that the sleeve $w$ may be dispensed with and that instead of the post $f$ a device similar to an ordinary king-bolt may be provided, connecting the two castings, which of course must be perforated to allow the passage of the same, the bearing-surfaces constituting the fifth-wheel being, if desired, somewhat larger in such case than those shown in the drawings.

Numerous other non-essential changes of detail can be made in the form, arrangement, combination, and attachment of the connecting pieces and braces which I have shown and above described without departing from the spirit and scope of my invention, as will be evident, such modified constructions, if if- fering from those here shown and described only in matters of non-essential detail, being equivalents of my invention.

Having thus described my invention, what I claim as new, and desire to secure by Letters Patent, is as follows:

1. In a vehicle frame or running-gear, the combination with a rear axle and wheels thereon, a forward fork and a wheel therein said fork being provided with diagonal braces $tt$, and a fifth-wheel device; of side pieces $ii$ having their front ends connected to the upper member of said fifth-wheel device and their middle portions to said rear axle, and braces $nn$ connecting said axle and said side pieces, substantially as herein set forth.

2. In a vehicle frame or running-gear, the combination with a rear axle and wheels thereon, a forward fork and a wheel therein said fork being provided with diagonal braces $tt$, and a fifth-wheel device; of side pieces $ii$ having their front ends connected to the upper member of said fifth-wheel device, their middle portions to said rear axle, and their rear ends to a casting $r$, braces $nn$ connecting said axle and said side pieces, and a brace $o$ connecting said axle with said casting $r$, substantially as herein set forth.

3. In a vehicle frame or running-gear, the combination with a rear axle and wheels thereon, a forward fork and a wheel therein said fork being provided with diagonal braces $tt$, and a fifth-wheel device; of side pieces $ii$ having their front ends connected to the upper member of said fifth-wheel device, their middle portions to said rear axle, and their rear ends to a casting $r$, braces $nn$ connecting said axle with said side pieces, a brace $o$ connecting said axle with said casting $r$, and a horizontal brace $x$ connecting the side pieces $ii$ together, substantially as herein set forth.

4. In a vehicle frame or running-gear, the combination with a rear axle and wheels thereon, a forward fork and a wheel therein said fork being provided with diagonal braces $tt$, and a fifth-wheel device; of side pieces $ii$ having their front ends connected to the upper member of the fifth-wheel device, their middle portions connected to supports adapted to connect the same to the rear axle and to elevate the same above the said axle, and their rear ends connected to a casting $r$, braces $nn$ connecting said axle with said side pieces, and a brace $o$ connecting said axle with said casting $r$, substantially as herein set forth.

5. In a vehicle frame or running-gear, the combination with a rear axle and wheels thereon, a forward fork and a wheel therein said fork being provided with diagonal braces $tt$, and a fifth-wheel device; of side pieces $ii$ having their front ends connected to the upper member of said fifth-wheel device, their middle portions connected to supports adapted to connect the same to said rear axle and to elevate the same above said axle, and their rear ends connected to the casting $r$, braces $nn$ connecting said axle with said side pieces, a brace $o$ connecting said axle with said casting $r$, and a brace $x$ connecting the said side pieces together, substantially as herein set forth.

6. In a vehicle frame or running-gear, the combination with a curved or arched rear axle and wheels thereon, a forward fork and a wheel therein said fork being provided with diagonal braces $tt$, and a fifth-wheel device; of side pieces $ii$ having their front ends connected to the upper member of said fifth-wheel device, their middle portions to the raised or arched portion of the rear axle, and their rear ends to the casting $r$, braces $nn$ connecting the ends or lower portions of the said axle with said side pieces, and a brace $o$ connecting the middle portion of said axle with the said casting $r$, substantially as herein set forth.

7. In a vehicle frame or running-gear, the combination with a curved or arched rear axle and wheels thereon, a forward fork and a wheel therein said fork being provided with diagonal braces $tt$, and a fifth-wheel device; of side pieces $ii$ having their front ends connected to the upper member of said fifth-wheel device, their middle portions to the raised or arched portion of said rear axle, and their rear ends to a casting $r$, braces $nn$ connecting the ends or lower portions of said axle with said side pieces, a brace $o$ connecting the middle portion of said axles with said casting $r$, and a brace $x$ connecting the said side pieces together, substantially as herein set forth.

8. In a vehicle frame or running-gear, the combination with a rear axle and wheels thereon, a forward fork and a wheel therein, and a fifth-wheel device; of side pieces $ii$ having their front ends connected to the upper member of said fifth-wheel device, their middle portions to supports adapted to connect the same to said rear axle and to elevate said side pieces above said axle, and their rear ends to a casting $r$, braces $nn$ connecting said axle with said side pieces, and a brace $o$ connecting said axle with said casting $r$, substantially as herein set forth.

9. In a vehicle frame or running-gear, the combination with a rear axle and wheels thereon, a forward fork and a wheel therein, and a fifth-wheel device; of side pieces $ii$ having their front ends connected to the upper member of said fifth-wheel device, their middle portions to supports adapted to connect the same to said rear axle, and to elevate said side pieces above said axle, and their rear ends to a casting $r$, braces $nn$ connecting said axle with said side pieces, a brace $o$ connecting said axle with said casting $r$, and a brace $x$ connecting said side pieces together, substantially as herein set forth.

10. In a vehicle frame or running-gear, the combination with a curved or arched rear axle and wheels thereon, a forward fork and a wheel therein, and a fifth-wheel device; of side pieces $ii$ having their front ends connected to the upper member of said fifth-wheel device, their middle portions to the raised or arched portion of said rear axle, and their rear ends to a casting $r$, braces $nn$ connecting the ends or lower portions of said axle with said side pieces, and a brace $o$ connecting the middle portion of said axle with said casting $r$, substantially as herein set forth.

11. In a vehicle frame or running-gear, the combination with a curved or arched rear axle and wheels thereon, a forward fork and a wheel therein, and a fifth-wheel device; of side pieces $i\ i$ having their front ends connected to the upper member of said fifth-wheel device, their middle portions to the raised or arched portion of the rear axle, and their rear ends to a casting $r$, braces $n\ n$ connecting the ends or lower portions of said axle with said side pieces, a brace $o$ connecting the middle portion of said axle with said casting $r$, and a brace $x$ connecting said side pieces together, substantially as herein set forth.

12. In a vehicle frame or running-gear, the combination with a curved or arched rear axle and wheels thereon, a forward fork and a wheel therein, and a fifth-wheel device; of side pieces $i\ i$ having their front ends connected to the upper member of said fifth-wheel device, their middle portions connected to the raised or arched portion of said rear axle, and their rear ends connected to a casting $r$, braces $n\ n$ connecting the ends or lower portions of the axle with said side pieces, a brace $o$ connecting the middle portion of said axle with said casting $r$, supporting-springs $p\ p$ and supporting-pieces $s\ s$, substantially as herein set forth.

13. In a vehicle frame or running-gear, the combination with a curved or arched rear axle and wheels thereon, a forward fork and a wheel therein said fork being provided with diagonal braces $t\ t$, and a fifth-wheel device; of side pieces $i\ i$ having their front ends connected to the upper member of the fifth-wheel device, their middle portions connected to the raised or arched portion of the rear axle, and their rear ends connected to a casting $r$, braces $n\ n$ connecting the ends or lower portions of the axle with said side pieces, a brace $o$ connecting the middle portion of said axle with said casting $r$, supporting-springs $p\ p$ and supporting-pieces $s\ s$, substantially as herein set forth.

14. In a vehicle frame or running-gear, the combination with a rear axle and wheels thereon, a forward fork and a wheel therein, and a fifth-wheel device; of side pieces $i\ i$ having their front ends connected to the upper member of said fifth-wheel device, their middle portions to supports adapted to connect them to said axle and to elevate them therefrom, and their rear ends to a casting $r$, braces $n\ n$ connecting said axle with said side pieces, a brace $o$ connecting the middle portion of said axle with said casting $r$, supporting-springs $p\ p$ and supporting-pieces $s\ s$, substantially as herein set forth.

15. In a vehicle frame or running-gear, the combination with a rear axle and wheels thereon, a forward fork and a wheel therein said fork being provided with diagonal braces $t\ t$, and a fifth-wheel device; of side pieces $i\ i$ having their front ends connected to the upper member of said fifth-wheel device, their middle portions to supports adapted to connect the same to said rear axle and to elevate the same therefrom, and their rear ends to a casting $r$, braces $n\ n$ connecting said axle with said side pieces, a brace $o$ connecting said axle with said casting $r$, supporting-springs $p\ p$ and supporting-pieces $s\ s$, substantially as herein set forth.

16. In a vehicle frame or running-gear, the combination with a rear axle and wheels thereon, a forward fork and a wheel therein said fork being provided with diagonal braces $t\ t$, and a fifth-wheel device; of side pieces $i\ i$ having their front ends connected to the upper member of said fifth-wheel device, their middle portions to supports adapted to connect the same to said rear axle and to elevate the same therefrom, and their rear ends to a casting $r$, braces $n\ n$ connecting said axle with said side pieces, a brace $o$ connecting said axle with said casting $r$, a brace $x$ connecting the said side pieces together, supporting-springs $p\ p$, and supporting-pieces $s\ s$, substantially as herein set forth.

In witness whereof I have hereunto signed my name, this 9th day of September, 1899, in the presence of two subscribing witnesses.

ABRAHAM BATH.

Witnesses:
JAMES E. BLOOMER,
WILLIAM F. MEADER.